United States Patent Office 3,357,239
Patented Dec. 12, 1967

3,357,239
GAS TURBINE ENGINE LIFE INDICATOR
Rudolph Hohenberg, Trumbull, Conn., assignor to Avco
Corporation, Stratford, Conn., a corporation of Delaware
Filed Aug. 10, 1965, Ser. No. 478,722
8 Claims. (Cl. 73—116)

This invention relates to a gas turbine engine life indicator and, more particularly, to a system for indicating exhausted engine life as a function of engine operating temperatures and time.

In accordance with present operating practice, total engine life is computed simply as a function of time of operation of the engine. Such a system is highly inaccurate because the manner in which the engine is used is a highly critical factor which this method does not take into accoount. As a result, current practice arbitrarily requires engine overhaul after a given number of hours of operation. Of necessity, this system requires the allowance of large tolerances to take into consideration the type of use, or misuse, that an engine may have undergone.

It is the premise of this invention that operation of a gas turbine engine at high gas temperatures causes more rapid deterioration than operation at low temperatures, and furthermore that jam accelerations and starts, resulting in extremely rapid gas temperature changes, deteriorate the engine faster than would normally be indicated by steady use of the engine over any one of the temperature ranges.

The ability to withstand stresses versus temperature of various engine materials has been relatively accurately determined, and this information is used in accordance with my invention as a basis for life factor versus temperature. The engine gas temperature is measured by a thermopile which generates a current having a magnitude which is a function of engine temperature. These currents are applied to an integrator first through a variable impedance network which develops a non-linear output approximating the reciprocal of the stress capability versus temperature curve and, second, through a differentiating network which serves to develop a current having a magnitude which is a function of the rate of change of temperature. The integrator sums the various currents, and with an appropriately calibrated indicator, displays the exhausted and/or remaining engine life.

It is the primary object of this invention to provide a system which indicates engine life as a time integration of a function of engine gas temperatures and the rate of change of engine gas temperatures.

Another object of this invention is to generate currents which are proportional to engine gas temperatures, to apply said currents to an integrator through a non-linear impedance network and through a differentiating network, said integrator summing the total currents applied, said summation indicating exhausted engine life.

For further objects and advantages of this invention and for a detailed description thereof, reference should now be made to the accompanying drawings in which.

Figure 2:
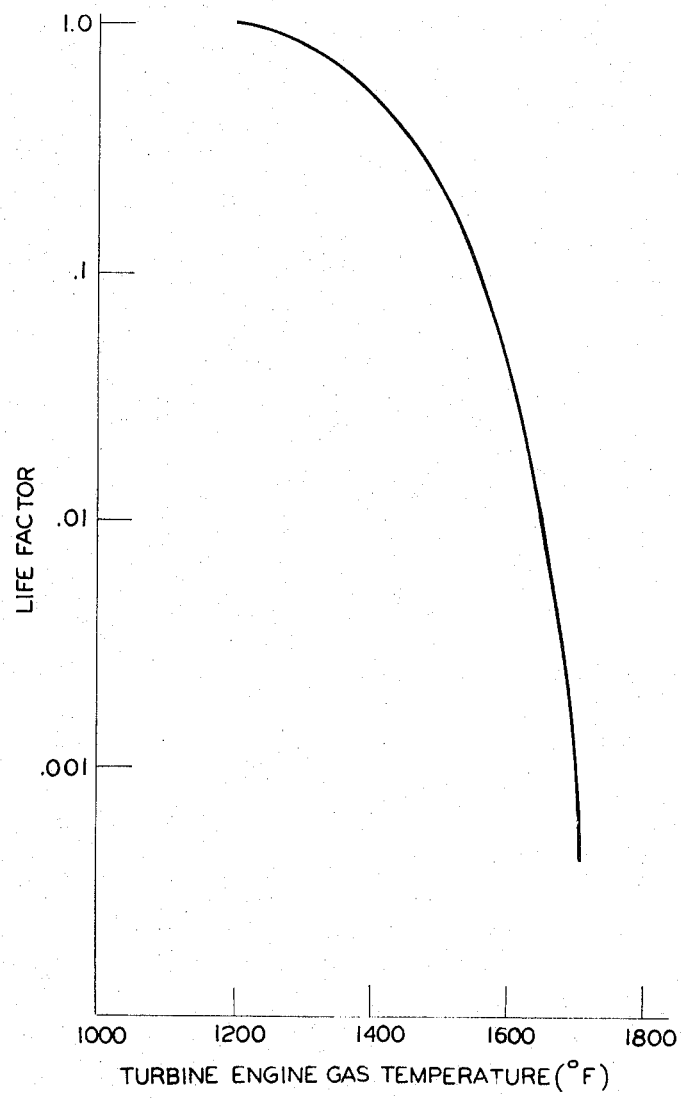
FIGURE 2 is a curve showing engine life factor versus gas temperature.

Referring first to FIGURE 2 where the engine life factor is plotted on a logarithmic scale versus temperature on a linear scale, it is noted that up to 1200° F. the engine may be expected to have a life factor of 1.0. This factor may represent any empirically determined number of hours, as, for example, 2000 hours. As the operating temperatures go up, the life factor goes down rapidly. For example, at 1550° F. the life factor is .1, while at 1700° F. the life factor is .001 and rapidly approaching zero. Thus, this invention requires a variable impedance which functions to deliver 10 times more current to the integrator at temperatures of 1550° F. than when operating at or below 1200° F. In addition, it has been observed that repeated large rapid gas temperature changes cause premature engine deterioration due to fatigue from the thermal stresses created by the temperature changes. This invention requires a differentiator to determine rate of change of temperature and means to supply heavy currents to the integrator, the magnitude of said currents being a function of the rate of change of temperature to account for damaging temperature changes created by jam accelerations and starts.

Figure 1:
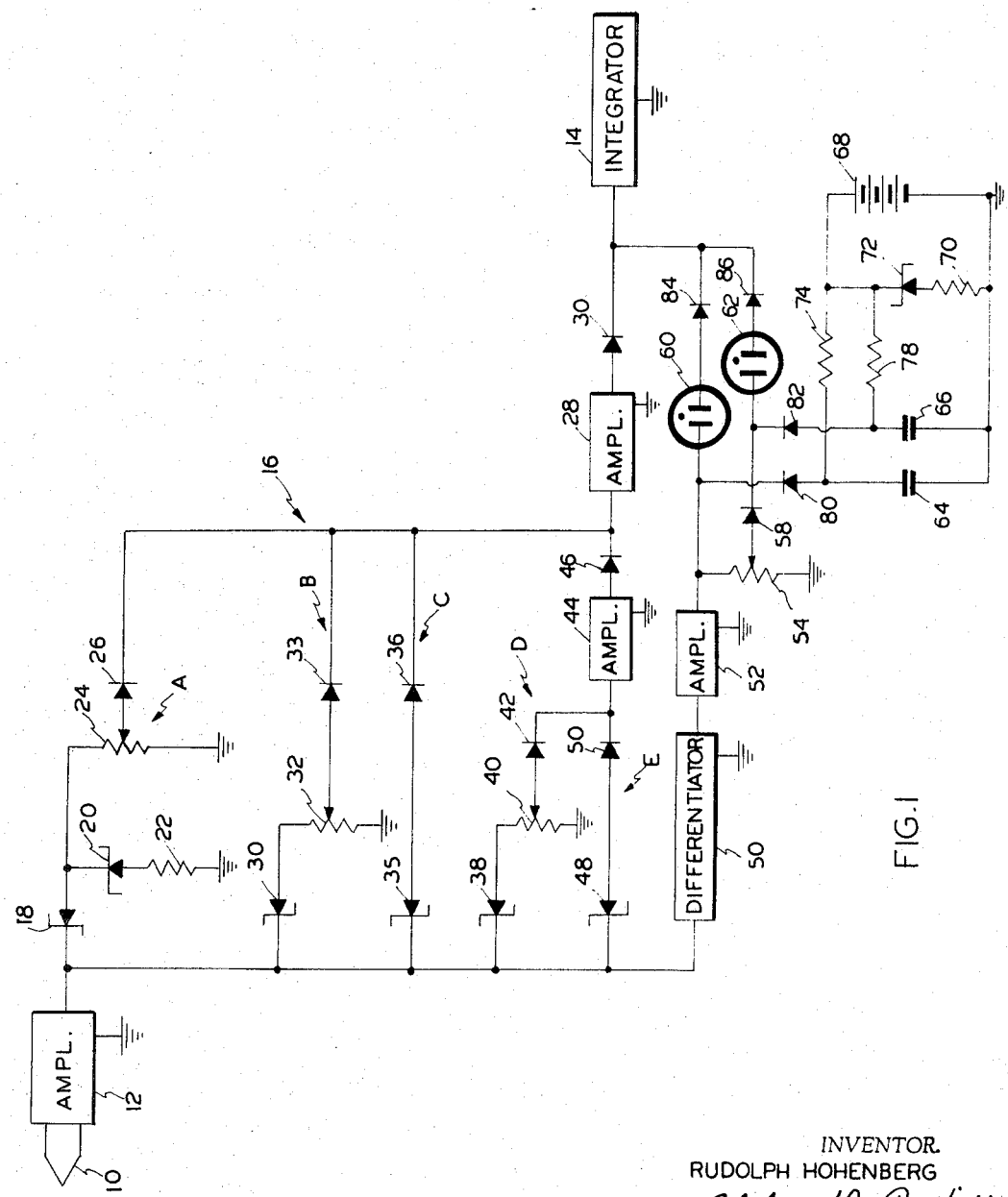
FIGURE 1 is a schematic diagram showing an illustrative form of this invention.

Referring now to FIGURE 1, the invention utilizes a conventional thermopile 10 positioned in the gas stream of a gas turbine engine for generating direct currents which are proportional to engine exhaust gas temperature. The direct currents are amplified in an amplifier 12 and applied to an integrator 14 through a variable impedance network 16, the purpose of which is to deliver a non-linear output current as a function of operating temperatures. With a life factor curve as shown in FIGURE 2, this non-linear function should approximate the curve of FIGURE 3.

For this purpose the variable impedance network 16 is made up of several parallel sections, each of which constitutes a high impedance until predetermined threshold levels are exceeded. The first section A includes back-biased zener diodes 18 and 20 in series with a current-limiting registor 22 connected across the output of the amplifier 12. The voltage developed across the zener idode 20 and the resistor 22 is coupled across a voltage-divider resistor 24 and applied through a diode 26 to an amplifier 28. The output from the amplifier is applied through a diode 30 to the integrator 14. Both of the zener diodes 18 and 20 are back biased by the output from the amplifier 12, and neither conducts appreciably until the voltage output from the amplifier 12 exceeds the zener breakdown region of the zener diode 18. In practice, the zener diodes 18 and 20 have a zener breakdown region at approximately 6 volts, with zener diode 20 having a higher breakdown than zener diode 18.

Connected in parallel with the section A is a section B including a back-biased zener diode 30 in series with a voltage-divider resistor 32, a portion of the voltage developed across the resistor 32 being applied to the amplifier 28 through a diode 33. In practice, the zener diode 30 is an 11-volt zener, and appreciably no current flows until the 11-volt zener region is exceeded.

A third network C, also connected in parallel, includes a back-biased zener diode 35 in series with a diode 36. In practice, the zener diode 34 is a 13.7-volt zener.

A fourth network D includes a zener diode 38 in series with a voltage-divider resistor 40 connected across the output of the amplifier 12, the voltage developed across a portion of the resistor 40 being connected to the amplifier 28 through a diode 42, an amplifier 44, and a diode 46. The zener diode 38 is a 14.5-volt zener.

A fifth network E includes a back-biased zener diode 48 in series with a diode 50 connected in series with the amplifier 28 through the amplifier 44 and diode 46. The zener diode 48 is a 15.1-volt zener.

Since the 6-volt zener diodes 18 and 20 are back biased by the output from the amplifier 12, their impedances are very high and essentially no current flow results until the output from the amplifier 12 exceeds the zener breakdown region of the diode 18, after which point current flow is relatively constant.

As the output from the amplifier 12 increases from above 6 volts to above 11 volts, the zener diode 30 begins to conduct, and a current which is a relatively linear function of the output of the amplifier 12 is added to the current from diode 26.

As the output from the amplifier 12 increases from above 6 volts to above 15.1 volts, each of the zener diodes 30, 34, 38, and 48 successively conducts and permits the flow of currents through its respective section to the amplifier 28 and the integrator 14. As each respective zener diode conducts, the over-all impedance of the network 16 is successively reduced, the total currents to the integrator 14 being the summation of the currents through the respective sections A to E.

Figure 3:
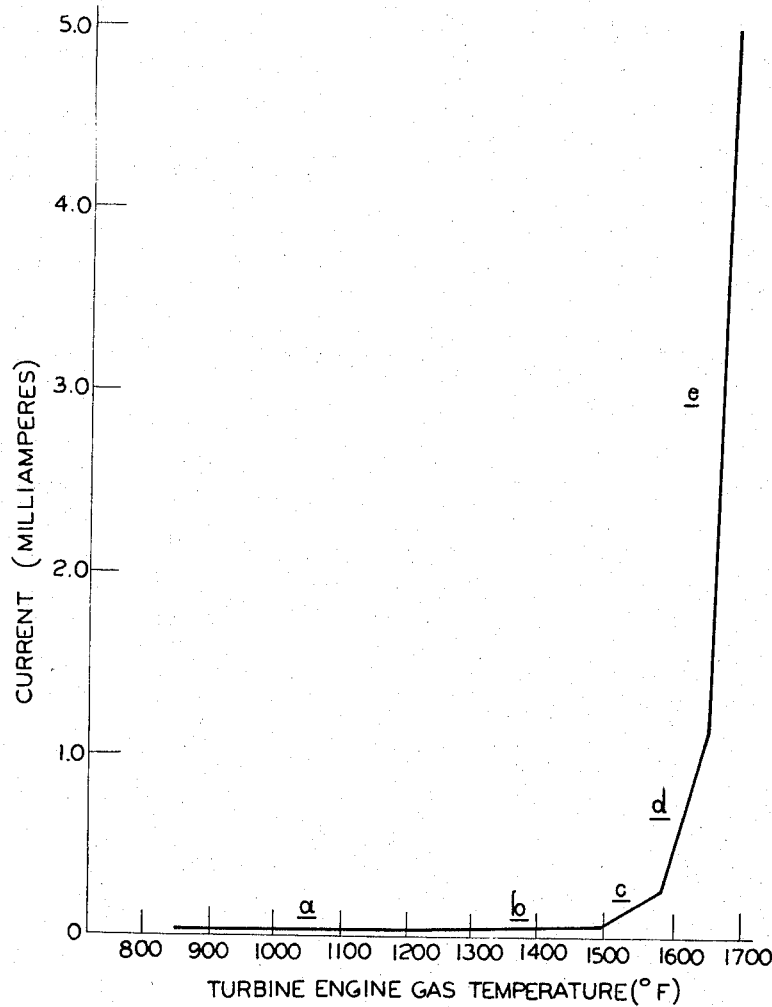
FIGURE 3 is a curve showing gas temperature versus current characteristics of the variable impedance network.

The currents through the various sections A to E are represented in FIGURE 3 at $a$ to $e$, respectively. The resultant non-linearity of the impedance sections constituting the network 16 is approximately the reciprocal of the engine life factor versus exhaust gas temperature curve of FIGURE 2. Thus, the total current applied to the intergrator 14 through the network 16 represents the exhausted engine life as a non-linear function of engine operating conditions.

In addition, the invention requires means for supplying currents to the integrator 14 which are a function of the rate of change of temperature when the rate exceeds given limits. For this purpose, the integrator 14 is supplied with current from the amplifier 12 through a network 48 including a differentiator 50. The differentiated currents are amplified in an amplifier 52 and applied across a voltage-divider resistor 54. The voltage developed across the resistor 54 is applied through a diode 56 to a normally non-conducting neon tube 60, while the voltage developed across a mid-portion of resistor 54 at tap 61 is applied through a diode 58 to a second normally non-conducting, essentially identical, neon tube 62. Also coupled to the neon tubes 60 and 62 are the voltages developed across two storage capacitors 64 and 66, respectively. The storage capacitors 64 and 66 are each charged from a direct current supply 68 across which are connected a current-limiting resistor 70 and a zener diode 72 in series. The charge time for the capacitors 64 and 66 is determined by the ressitors 74 and 78, respectively. The voltage charge developed on capacitor 64 is applied to the neon tube 60 through a diode 80, while the voltage charge developed across the capacitor 66 is applied to the neon tube 62 through a diode 82.

In the absence of a voltage of predetermined magnitude applied to the neon tubes 60 and 62 through the diodes 56 and 58, respectively, the neon tubes remain non-conductive. Since the voltage applied to the neon tube 60 is developed from across the whole resistor 54 while the voltage applied to the neon tube 62 is developed at the tap 61, the neon tube 60 will conduct when the voltage across the resistor 54 is at one level, while the neon tube 62 will conduct only after the voltage across resistor 54 exceeds a second predetermined level. The second level is, of course, a function of the position of tap 61. When the voltage applied to either neon tube exceeds the predetermined level, each will conduct. If the neon tube 60 is rendered conductive, the voltage developed on capacitor 64 discharges through the diode 80, the neon tube 60, and a diode 84 through the integrator 14. As the capacitor 64 is discharged, the neon tube 60 becomes non-conductive until such time as the capacitor 64 is recharged to its nominal value, at which time conduction of the neon tube 60 may again take place if the rate of change of temperature has not diminished. Similarly, if the neon tube 62 conducts, the capacitor 66 discharges through it and a diode 86 to the integrator 14.

The integrator 14 may take any convenient form; for example, a conventional watt hour meter which sums the total current and provides an indication of the total current consumption would be adequate. In the preferred embodiment of this invention, an integrator with indicator of the type shown in Corrsin Patent 3,045,178 issued July 17, 1962, is preferred since the life factor may be conveniently represented on the indicator scale of this type of device.

It is obvious that many variations and modifications of this invention will become apparent to persons skilled in the art. For example, the particular type of variable impedance network 16 may take any one of various forms so long as its impedance varies with current magnitude as a non-linear function which will serve to approximate the reciprocal of the life versus temperature characteristic of the materials of the particular engine being used. Moreover, the particular type of network for developing signals representing the rate of change of temperature may be modified so long as an output representing the equivalent effects of a jam acceleration or start is produced. It is intended, therefore; that this invention be limited only by the appended claims as interpreted by the prior art.

What is claimed is:

1. A system for determining the exhausted life of an internal combustion engine as a function of an operating parameter and time, said engine having a life expectance characteristic which is a function of said operating parameter, the combination comprising:

means for continuously generating signals proportional to the instantaneous level of said engine operating parameter;

an integrator for summing the signals applied thereto;

impedance means coupling said signals to said integrator, said impedance having impedance versus signal magnitude characteristics which approximate the reciprocal of said life expectancy characteristic, whereby the summation of said signals in said intergator is approximately proportional to the exhausted life of said engine;

means derviving from said signals additional signals proportional to the rate of change of said parameter;

and means when said additional signals exceed a predetermined magnitude for coupling said additional signals to said integrator, whereby said additional signals are also summed by said integrator.

2. The invention as defined in claim 1 wherein said parameter is the operating temperature of said engine.

3. The invention as defined in claim 2 wherein said variable impedance comprises a plurality of zener diodes connected in parallel, said zener diodes each having a diferent zener breakdown region.

4. A system for determining the exhausted life of an internal combustion engine as a function of engine operating temperature and time, said engine having a life expectancy characteristic which is a function of temperature, the combination comprising:

means for continuously generating signal currents proportional to the instantaneous operating temperature of said engine;

an integrator for summing said signals applied thereto;

an automatically variable impedance coupling said signal currents to said integrator, said impedance having impedance characteristics which approximate the reciprocal of said life expectancy characteristic;

a differentiator for differentiating said signals to produce an output voltage proportional to the rate of change of temperature;

a current storage device;

means when said output voltage exceeds various predetermined levels for discharging currents proportional to said levels from said storage device into said integrator whereby said additional signals are also summed by said integrator;

whereby the magnitude of the summation in said integrator of said signal currents and the current from said current storage device is approximately proportional to the exhausted life of said engine.

5. The invention as defined in claim 4 wherein said variable impedance comprises a plurality of zener diodes connected in parrallel, said zener diodes each having a different zener breakdown region.

6. The invention as defined in claim 4 wherein said current storage device comprises a plurality of capacitors and a like plurality of normally open electronic switches, each of said capacitors and a respective switch being connected in series with said integrator;
a direct current source for charging said capacitors; and wherein said switches are successively closed by said output voltage as said output voltage exceeds said various predetermined levels.

7. The invention as defined in claim 6 wherein said electronic switches are neon tubes; and wherein said output voltage is applied across a voltage-dividing resistor; and wherein said neon tubes are biased from different points on said voltage-dividing resistor.

8. The invention as defined in claim 7 wherein said variable impedance includes a plurality of zener diodes connected in parallel, said zener diodes each having a different zener breakdown region.

References Cited
UNITED STATES PATENTS 3,237,448  3/1966  Howell et al. _____ 73—116
3,250,901  5/1966  Brahm _____ 73—116 X RICHARD C. QUEISSER, *Primary Examiner.*

JAMES J. GILL, *Examiner.*

J. W. MYRACLE, *Assistant Examiner.*